United States Patent [19]

Imler

[11] 4,072,493
[45] Feb. 7, 1978

[54] METHOD AND APPARATUS FOR RESHAPING GLASS SHEETS

[75] Inventor: Vaughn R. Imler, Valencia, Pa.

[73] Assignee: PPG Industries, Inc., Pittsburgh, Pa.

[21] Appl. No.: 763,259

[22] Filed: Jan. 27, 1977

Related U.S. Application Data

[63] Continuation-in-part of Ser. No. 720,866, Sept. 7, 1976, abandoned.

[51] Int. Cl.² ............................................. C03B 23/02
[52] U.S. Cl. ......................................... 65/107; 65/288; 65/291
[58] Field of Search ................. 65/106, 107, 288, 291, 65/374 RM

[56] References Cited

U.S. PATENT DOCUMENTS

| 2,111,392 | 3/1938 | Galey | 65/273 |
|---|---|---|---|
| 2,176,999 | 10/1939 | Miller | 65/107 |
| 2,215,228 | 9/1940 | Oliver | 65/107 |
| 2,950,573 | 8/1960 | Bamford et al. | 65/289 |
| 2,999,338 | 9/1961 | Richardson | 65/273 |
| 3,160,491 | 12/1964 | Binkert et al. | 65/107 |
| 3,227,538 | 1/1966 | Binkert et al. | 65/289 |
| 3,233,996 | 2/1966 | Cox et al. | 65/107 |
| 3,248,195 | 4/1966 | Golightly et al. | 65/107 |
| 3,278,288 | 10/1966 | Leflet, Jr. | 65/104 |
| 3,762,903 | 10/1973 | Hamilton | 65/107 |
| 3,762,904 | 10/1973 | Hamilton et al. | 65/107 |
| 3,795,501 | 3/1974 | Jansson et al. | 65/106 |
| 3,795,570 | 3/1974 | Jansson et al. | 161/125 |
| 3,847,586 | 11/1974 | Reese et al. | 65/290 |
| 3,865,680 | 2/1975 | Reese et al. | 65/107 X |
| 3,879,184 | 4/1975 | Hamilton et al. | 65/107 |
| 3,880,636 | 4/1975 | Tobin et al. | 65/107 |

Primary Examiner—Arthur D. Kellogg
Attorney, Agent, or Firm—Dennis G. Millman; Edward I. Mates

[57] ABSTRACT

Method and apparatus for shaping one or more glass sheets by gravity sag bending to a shape including one or more sharp bends by combining overall heating and localized heating using one or more electroconductive heating ribbons and guiding means to locate the ribbons below the shaping surface of a sectionalized mold in positions which do not interfere with loading or unloading of glass sheets on said mold.

21 Claims, 11 Drawing Figures

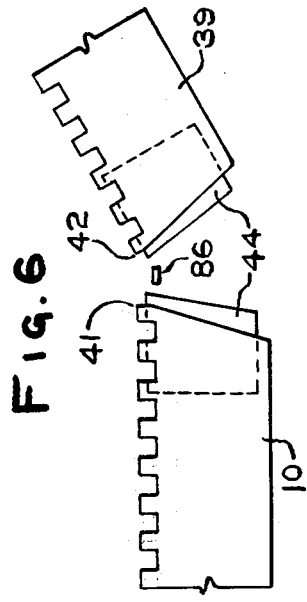
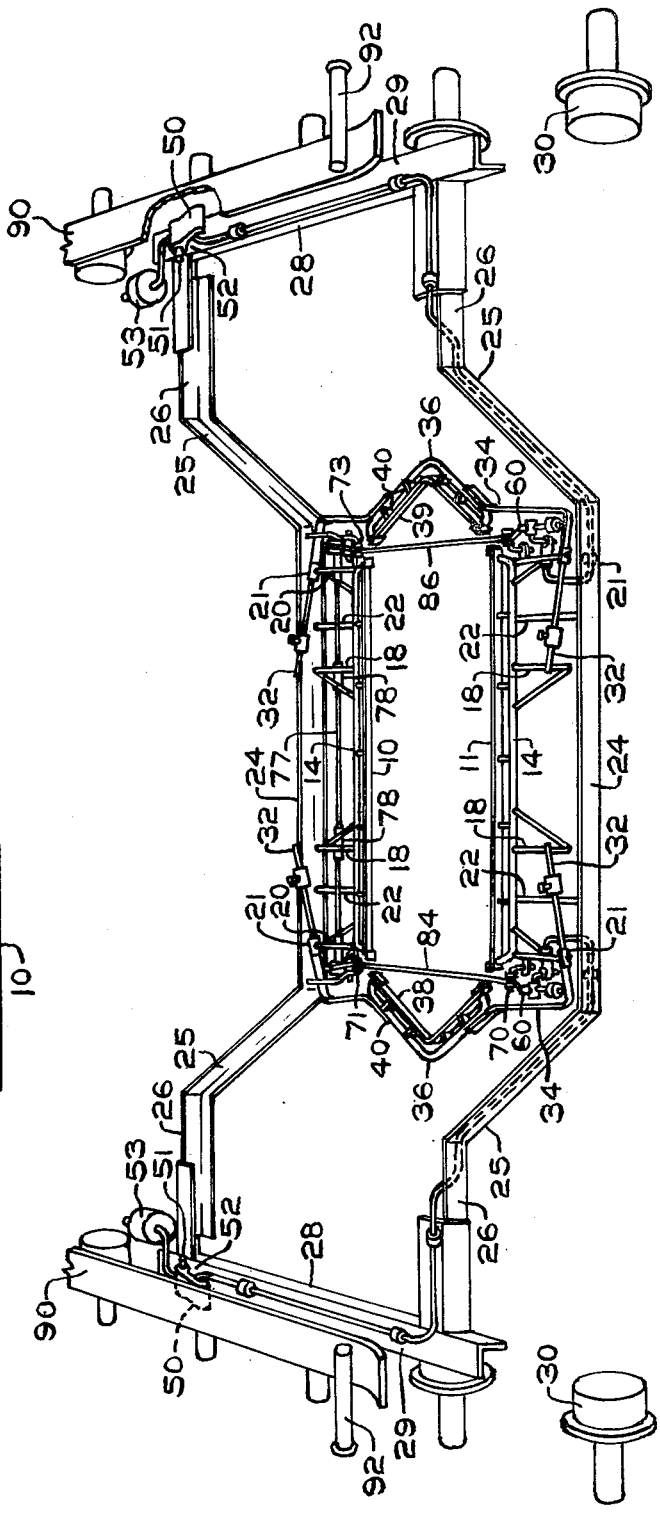

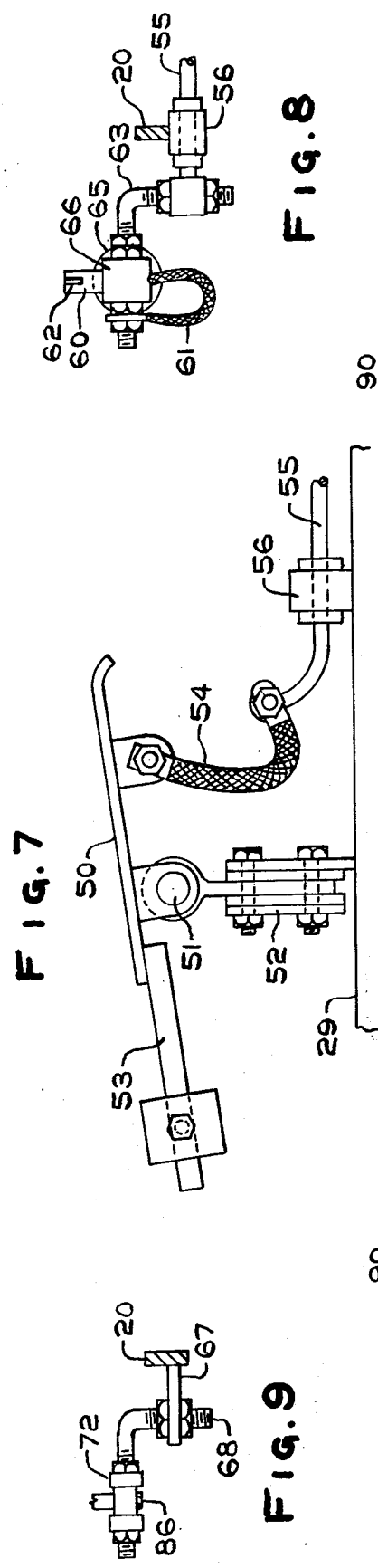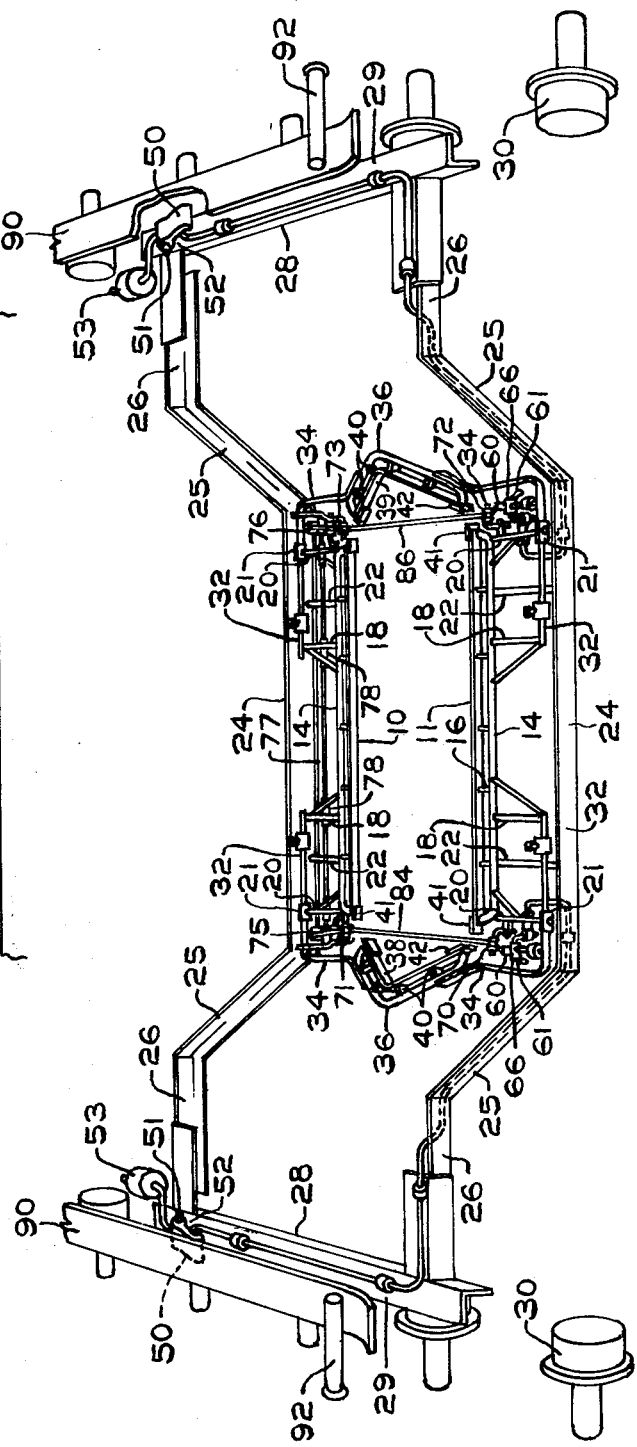

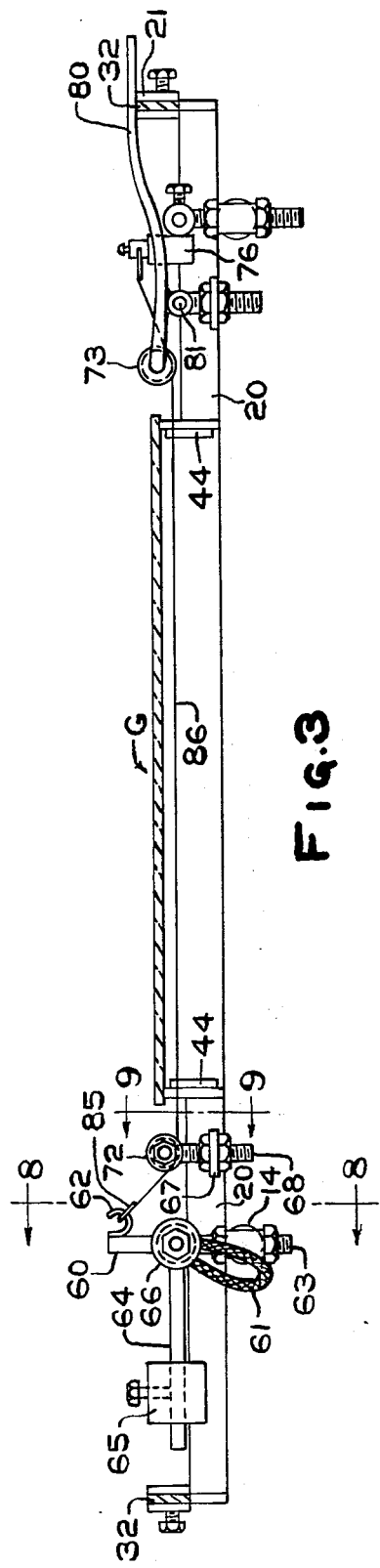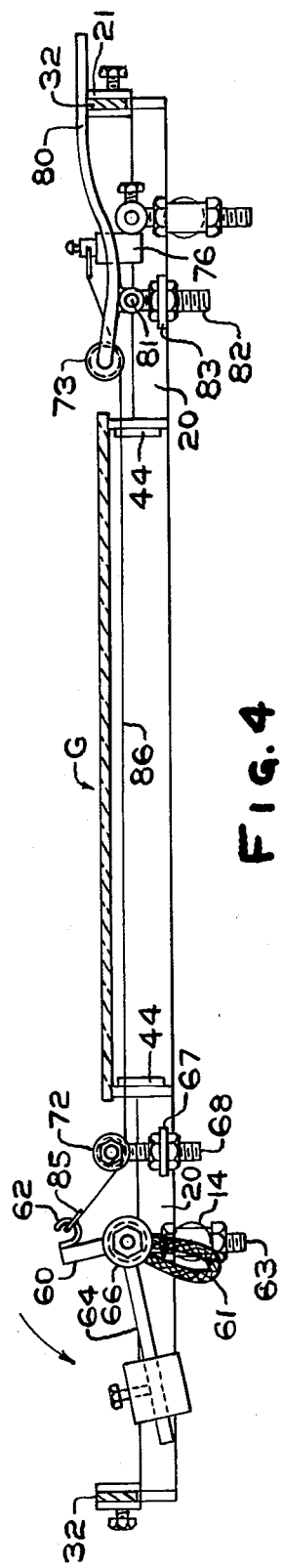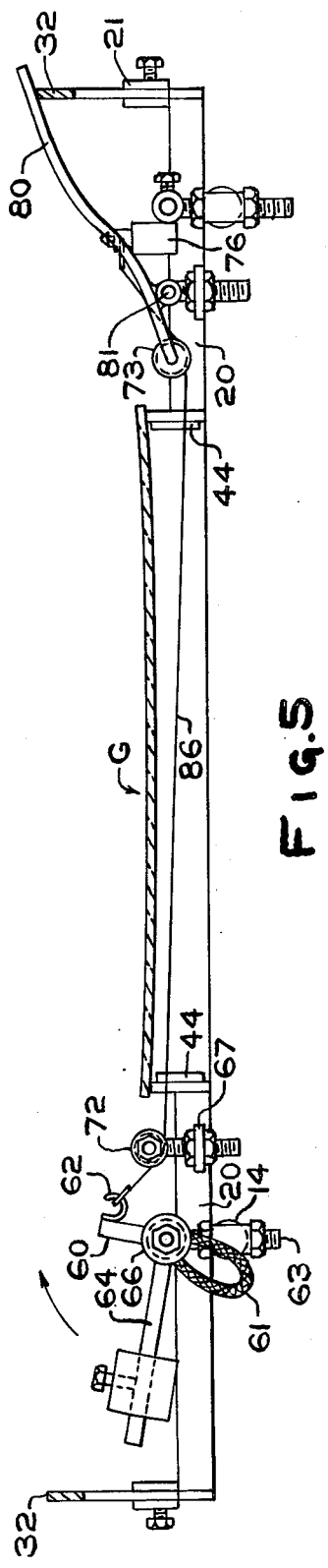

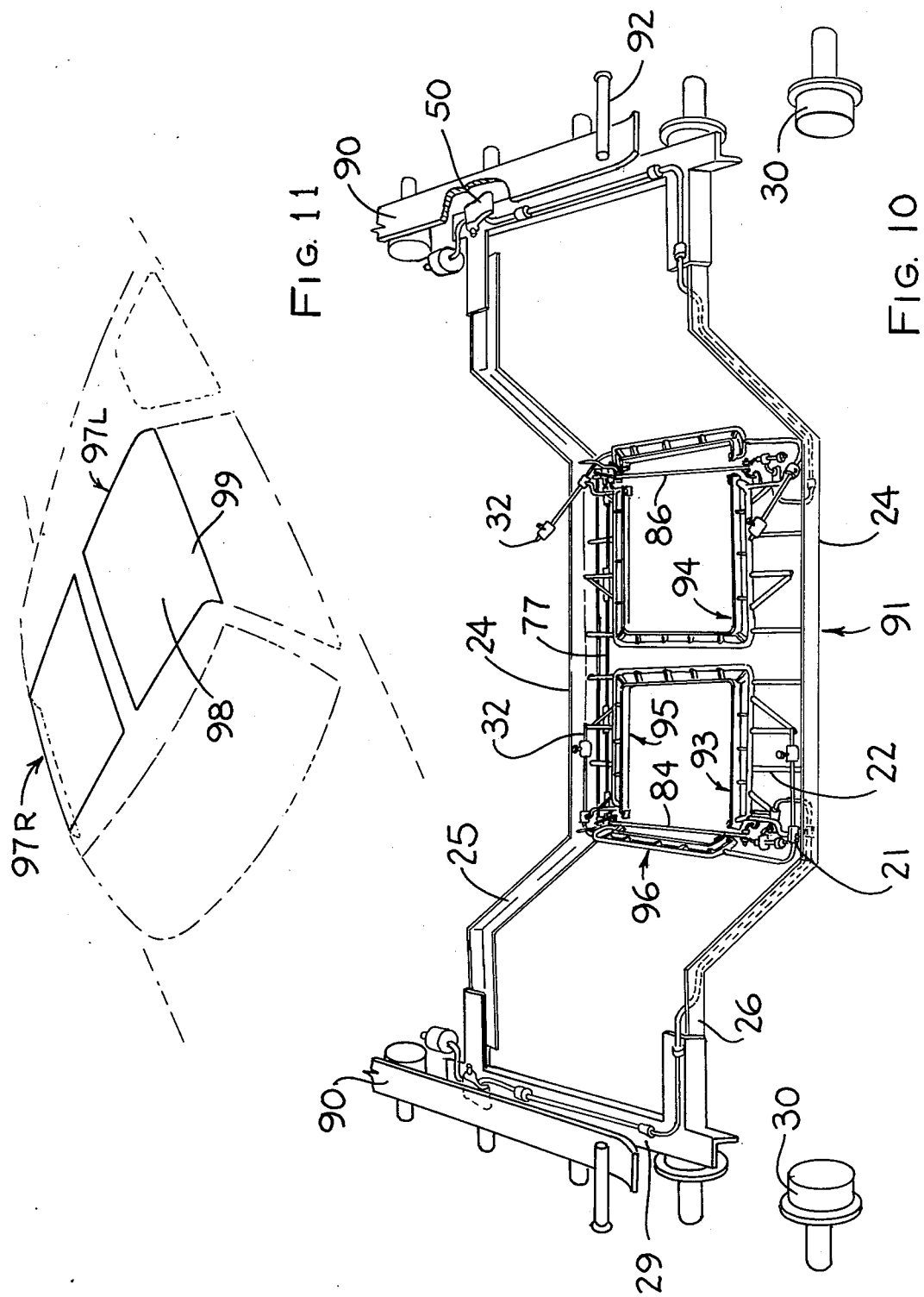

METHOD AND APPARATUS FOR RESHAPING GLASS SHEETS

RELATION TO OTHER APPLICATIONS

This application is a continuation-in-part of U.S. patent application Ser. No. 720,866, of Vaughn R. Imler for Shaping Glass Sheets, filed Sept. 7, 1976 now abandoned.

BACKGROUND OF THE INVENTION

1. Field of the Invention

The present invention relates to shaping glass sheets into complicated shapes incorporating one or more sharp lines of bending extending completely across a dimension, i.e., the length or the width, of the bent glass sheet. Such lines of bending provide continuations of lines of sharp bending in the automobile body in which the bent glass is installed. Such bends satisfy the desires of automobile stylists to incorporate shaped glass sheets whose shapes conform to the shape of the automobile body in which the glass is mounted. Such bends are useful as windshields, back windows, side windows and roof windows of automobiles and other vehicles and may also be used in shaped windows in buildings and for other articles such as showcases, shaped instrument covers and the like.

2. Description of the Prior Art

In recent years, several patents have issued relating to the bending of glass sheets to sharp curvatures. U.S. Pat. No. 3,762,903 to Harold E. Hamilton discloses the application of an elongated line of electroconductive frit of ceramic silver or other suitable electroconductive material in one or more layers along a line desired for sharp bending to one or more surfaces of one or more glass sheets to be shaped on an outline bending mold defining a V-shaped configuration desired for the bent glass. The glass sheet is initially heated to a temperature slightly below the glass softening point that is sufficient to fuse the frit along the line of sharp bending. Electrodes are held against the opposite ends of the electroconductive frit and voltage is impressed between the electrodes. The impressed voltage passes current through the frit, thereby heating the frit electrically. The electrically induced heat raises the glass temperature locally along the line desired for sharp bending. The glass sags rapidly along the line of sharp bending until it conforms to the shaping surface of the V-shaped outline mold. The frit remains as an opaque line extending across a dimension of the ultimate product because it is very difficult to remove a fused ceramic frit.

U.S. Pat. No. 3,762,904 to Harold E. Hamilton, Robert E. Bamford and Paul Pastorek discloses forming a groove in a glass surface along a line of sharp bending, applying a line of electroconductive frit that is fusible onto the glass either in the groove or aligned with the groove along the surface of the glass opposite the grooved surface. The electroconductive frit fuses to the glass to provide an opaque line in the finished product. Furthermore, while grooves accentuate the rate at which the glass sheet sags along the line of sharp bending, grooving weakens the glass and also enhances optical distortion. Therefore, grooving preferably should be avoided.

U.S. Pat. No. 3,879,184 to Harold E. Hamilton and Ivan L. Soreghy discloses a process for altering the residual stain remaining along the relatively sharp bend of a glass sheet resulting from the passage of an electric current through an elongated line of electroconductive material previously applied to a glass surface by interposing a strip of coloring agent between the glass sheet surface and the line of electroconductive material along a line lengthwise of the line of electroconductive material before applying the voltage that causes electrical heating of the glass along the line desired for sharp bending.

In each of the three patents enumerated thus far, the application of electrodes to the ends of the lines of electroconductive material causes problems in maintaining the sharp bend at the ends of the line of sharp bending. U.S. Pat. No. 3,865,680 to Thomas J. Reese and Harry S. Koontz discloses a technique where transverse extensions of the line of electroconductive frit are applied to extend in offset relation from the ends of the line of sharp bending to provide relatively large areas for electroconductive contact with the electrodes through which electrical power is applied. While this invention improves the sharpness of bend, particularly at the edges of the bent glass sheet, this technique also leaves the problem of removing frit from the bent glass sheet.

U.S. Pat. No. 3,795,501 to Robert A. Jansson and Thomas J. Reese; U.S. Pat. No. 3,795,570 to Robert A. Jansson and Dean L. Thomas and U.S. Pat. No. 3,847,586 to Thomas J. Reese, George R. Claassen and Melvin W. Tobin relate to method and apparatus for bending glass sheets into curvatures including a sharp bend using one or more narrow, elongated ribbon of electroconductive material which may be removed from the line of sharp bending after the glass is shaped. In each of the latter three patents, it is necessary to complicate the loading and unloading of the glass relative to the mold because of the need to apply and remove the narrow, elongated ribbon of electroconductive material relative to the glass in conjunction with loading or unloading the glass relative to the mold.

U.S. Pat. No. 2,111,392 to Henry J. Galey; U.S. Pat. No. 2,176,999 to Robert A. Miller; U.S. Pat. No. 2,215,228 to James G. Oliver and U.S. Pat. No. 3,248,195 to James S. Golightly and Harold E. McKelvey disclose the use of radiant heaters in glass sheet bending apparatus that apply sharp localized bends to a glass sheet along an elongated axis thereof. However, these patents show apparatus that support the heaters in such positions that it is difficult to load or unload a glass sheet from the mold.

U.S. Pat. No. 2,950,573 to William P. Bamford, Frank J. Carson and Leslie H. Laine and U.S. Pat. Nos. 3,160,491 and 3,227,538 to Carl F. Binkert and Leslie H. Laine show apparatus comprising a single carriage that supports a pair of molds for bending pairs of glass sheets to mirror images of one another simultaneously. These apparatus do not include elongated heating elements, such as electroconductive ribbons, supported on the mold.

U.S. Pat. No. 2,999,338 to Ronald L. Richardson discloses a mold for bending glass sheets to compound curvatures. In this patented apparatus, electrical heating elements are carried by a pivotable overhead member which must be pivoted out of the way to load and unload a glass sheet relative to the mold. In addition, localized heaters are permanently installed within the outline end sections of a sectionalized mold. These localized electrical heaters are permanently mounted below the glass surface in the open or spread-apart position of the end mold sections of the sectionalized mold and the glass moves upward away from the localized electrical heaters as the glass is lifted while it is shaped.

SUMMARY OF THE INVENTION

It is a primary object of the present invention to provide a sectionalized mold for bending glass sheets by the gravity sag method that incorporates one or more elongated, flexible, electroconductive metal ribbons that are located below the mold shaping surface in the area subtended by the shaping rails that comprise the mold and guiding means to prevent the heating elements from contacting the hot glass surface, and a method of bending glass sheets by the gravity sag method to a shape including one or more sharp bends while the glass is supported over such a mold.

The present invention provides a method and apparatus for shaping a glass sheet to a complicated shape including one or more sharply curved, crease-like bends extending across an entire dimension, namely, the length or the width of the sheet. Apparatus for performing the method according to a specific embodiment of the present invention comprises a mold support carriage supporting an outline metal mold of the skeleton type including a main mold section comprising a pair of longitudinally extending shaping rails fixed to the carriage to form longitudinal side portions of an outline shaping surface of the mold and an end shaping rail pivotally connected relative to the main mold section for pivoting between a spread position where its inner ends are longitudinally spaced from the adjacent longitudinal ends of the fixed shaping rails for receiving flat glass sheets for bending and a closed mold position where the inner ends are closely spaced from the longitudinal ends of the longitudinally extending shaping rails to define a longitudinal end portion of a discontinuous outline shaping surface for the mold that conforms in elevation and plan outline to the shape desired for shaped glass sheets.

In another specific embodiment, the main mold section is flanked at each end with a pivotable end shaping rail. Localized heating means is provided by one or more flexible metal ribbons, each supported in insulated relation to the shaping rails below the mold shaping surface in non-contacting relation to the supported glass between electrodes disposed beyond the mold outline along a line that is closely adjacent to a pair of transversely spaced longitudinal ends of the longitudinally extending shaping rails. The apparatus may include means to insulate the ribbon from the metal shaping rails. Guiding means engage each ribbon and cooperate with ribbon tensioning means to hold the ribbon in a vertical position below the outline shaping surface and out of contact with the glass supported on the mold for bending.

When the glass sheet is to be bent sharply only along one line of sharp bending near one end, the other ends of the shaping rails of the main mold section are connected together at one end thereof and only one end shaping rail is pivoted relative to the laterally opposite pair of ends of the shaping rails of the main mold section longitudinally opposite from the interconnected ends. A single ribbon is supported beneath the mold shaping surface and extends across the mold along a line adjacent and below a line connecting the transversely opposite ends of the main mold section shaping rails that are adjacent to the pivoting end shaping rail in a closed mold position.

If the size of the glass sheets to be shaped permits, a pair of mirror image duplicates can be fabricated in unison by mounting a pair of molds in mirror image relation to one another on a single mold support carriage for simultaneous processing. Each mold of the aforesaid pair comprises a pivotable end shaping rail that pivots relative to a main mold section and a single ribbon supported beneath the mold shaping surface and extending along a line aligned with the space between the adjacent ends of the main mold section and the inner end of the pivotable shaping rail. Each mold supports a glass pattern that is the mirror image of the pattern supported by the other mold of the mold pair.

In a preferred embodiment for producing especially severely bent shapes, when the ribbon is positioned very close to the glass surface to maximize the heating obtained along a line of sharp bending, means is provided to bias the ribbon downward in response to the pivoting of an adjacent end shaping rail to a closed mold position. This downward bias feature may be omitted in case the sharpness of bend is not so intense so that the ribbons can be supported permanently on the mold at sufficient distance below the glass greater than the maximum amount the glass sheet sags during a shaping operation.

In any of these embodiments, any electroconductive ribbon used to impart localized intense heat to produce the sharp bend is permanently mounted on the mold below the shaping surface in the area defined by the shaping rails so that when the mold is open to support a glass sheet, the ribbon is below the position occupied by the flat glass sheet when the latter is mounted on the mold for shaping and remains below said glass sheet occupying position throughout the bending operation when the glass sheet is mounted on the mold. This feature of the present invention prevents the ribbons from contacting the glass and marring the latter, yet the ribbons are kept sufficiently close to the glass along the lines to be bent sharply to insure a thin line of intense heat.

According to a specific embodiment of the method of the present invention, a glass sheet to be bent is mounted for support intermediate its longitudinal extremities on the ends of the upward facing surface of a pair of main section shaping rails adjacent the inner ends of a pivotable end shaping rail of an outline mold of concave elevation, with a ribbon of electroconductive heating material supported below the mold shaping surface in closely spaced relation to the lower surface of the sheet along each line parallel to the lines formed across the width of the mold between transversely spaced support locations at the ends of the main mold section shaping rails. The mold and its supported glass sheet are heated by overall furnace heat to a temperature near the deformation temperature of the glass with the ribbon spaced below the glass sheet a distance dependent upon the sharpness of bend desired. At an appropriate time in the heating cycle, the elongated ribbons of electroconductive heating material are energized by applying voltage thereto according to a desired time cycle of voltage application. The voltage causes the ribbons to radiate more intensive heat locally into the glass sheet along the lines of sharp bending. This localized intensive heat accelerates the shaping of the glass sheet about the lines of sharp bending. Each flexible electroconductive ribbon is either maintained in tension at a fixed distance below one or the other line of support provided by the two pairs of support locations or is lowered relative to the glass sheet as the portion of the glass sheet to be bent sharply forms a crease-like bend. Just before or at approximately the same time as the glass sheet conforms to the shaping surface of the mold, the voltage to the ribbon is stopped, the bend is completed by overall heating and the mold is removed from the heating area and transferred to a cooling area where the shaped glass is cooled at a rate sufficient to impart a desired degree of temper or anneal.

The outline mold of the skeleton type according to a specific embodiment of the present invention comprises an elongated array of metal shaping rails disposed edgewise to form a sectionalized bending mold of concave elevation and comprises a pair of pivoted end mold rails forming end mold sections, each pivoted to a pair of hinges or bearings housings to rotate relative to a pair of longitudinally extending rails transversely spaced from one another and disposed along the length of the opposite sides of the mold to form a main section of the mold. The upper edges of the rails form a shaping surface conforming substantially to the shape desired a short distance inside of the outline of the glass sheet after bending when the end mold rails are pivoted inwardly. The end mold rails pivot outwardly to a flat glass supporting position in which the ends of the pair of longitudinal shaping rails provide two pairs of support locations for the flat glass along lines extending across the mold between the transversely opposite ends of the longitudinally extending rails.

The elongated ribbons of electroconductive material are each supported between a pair of ribbon guiding means. In a specific embodiment of this invention, the guiding means comprises a first grooved spool located laterally outside one end of one longitudinally extending shaping rail and a second grooved spool located laterally outside of the laterally opposite end of the other longitudinally extending shaping rail and along a transverse line of alignment with the first grooved spool. Each ribbon is tensioned to provide a straight line between the bottoms of the grooved portions of the spools. The transverse lines of alignment between the grooved spools lie in transverse lines that are below and adjacent to the transversely extending lines between the corresponding transversely opposite ends of the longitudinally extending shaping rails of the main mold section. In the alternative, the grooved spools may have their top portions engage the bottom surface of the ribbon provided the ribbon is tensioned at an elevation below the ribbon engaging surface of the spools and the grooved surface of the spools is below the line of support for the flat glass sheet.

In order to prevent electrical energization of the mold in case the current in the ribbon is not discontinued in time, means is provided to insulate the ends of the shaping rails from the ribbons. To accomplish this object, each end of the longitudinally extending shaping rails and each inner end of the end shaping rails is covered with an insulator material to avoid direct contact between the metal of the mold and the ribbons. The insulator material is preferably a cover sheet of dielectric material attached to a cut-away end portion of each longitudinally extending rail portion. Thus, the energized ribbon of electroconductive material is maintained in electrical insulation from the metal mold rail throughout the bending operation and in closely spaced relation to the glass sheet area to be bent sharply throughout the portion of the bending cycle during which said area is exposed to intensive localized heating.

These and other features of the present invention will become obvious in the light of a description of an embodiment of glass sheet bending mold used to bend glass sheets to a double V-shape according to the present invention which follows. It is understood that the present invention is equally applicable to the shaping of a glass sheet to a bend that includes a single line of sharp bending. In such a case, the elongated shaping rails of the main mold section are connected together by a cross rail at one end distant from a pivoted end shaping rail and only one ribbon is supported below the mold shaping surface along a line below and adjacent a line formed between the ends of the elongated shaping rail that are adjacent to the inner ends of the single pivoted end shaping rail.

BRIEF DESCRIPTION OF THE DRAWINGS

In the drawings which form part of the description of a specific embodiment of this invention and where like reference numbers refer to like structural elements:

FIG. 1 is a perspective view of a glass sheet bending mold conforming to the present invention in the open mold position preparatory to mounting a flat glass sheet thereon for bending;

FIG. 2 is a view similar to FIG. 1 showing the mold in its closed position that it assumes supporting the glass sheet after the latter has been shaped to a desired shape;

FIG. 3 is a fragmentary, enlarged, cross-sectional view of the mold of FIGS. 1 and 2, showing the relation of a flat glass sheet to various structural mold elements including a transversely opposite pair of ends of longitudinally extending shaping rails forming one of said pair of transverse lines of support, a flexible, electroconductive ribbon, a pair of electrodes and ribbon guiding means, when a flat glass sheet is mounted on the mold at the beginning of a bending cyle;

FIG. 4 is a fragmentary, enlarged, cross-sectional view similar to FIG. 3, illustrating the relative positions assumed by the elements shown in FIG. 3 during an intermediate portion of a bending cycle;

FIG. 5 is a fragmentary, enlarged, cross-sectional view similar to FIGS. 3 and 4, illustrating the relative positions assumed by the elements depicted in FIGS. 3 and 4 at the end of a bending cycle;

FIG. 6 is an enlarged, fragmentary view showing the portion of the mold where an electroconductive ribbon crosses between the adjacent diverging ends of a main section shaping rail and an end shaping rail and depicting their relative positions that make it unnecessary to mount and remove the ribbon for loading and unloading a glass sheet;

FIG. 7 is an enlarged, fragmentary view of an electrical connection portion of an electrical circuit included in the specific embodiment of the present invention;

FIG. 8 is an enlarged, fragmentary view taken along the lines 8—8 of FIG. 3, showing how electrodes are connected and supported;

FIG. 9 is an enlarged, fragmentary view taken along the lines 9—9 of FIG. 3, showing how ribbon guiding means is adjustably mounted in insulating relation to the mold;

FIG. 10 is a perspective view of an alternate embodiment of this invention comprising a pair of molds mounted on a single carriage for simultaneous processing of glass sheets into patterns that are the mirror images of one another; and FIG. 11 is a perspective view showing how the glass sheet pair processed by the apparatus of FIG. 10 is mounted in the roof of an auto shown in phantom.

DESCRIPTION OF THE PREFERRED EMBODIMENT

Referring to the drawings, FIGS. 1 to 9 show a sectionalized, outline, bending mold of the gravity sag type comprising a main mold section and a pair of end mold sections. The main mold section comprises a pair of longitudinally extending shaping rails 10 and 11 of stainless steel that are shaped in elevation and outline to conform to the longitudinal side edges of the mold. The rails 10 and 11 are transversely spaced from one another. Each of the longitudinally extending shaping rails 10 and 11 is disposed with its width extending vertically transverse to its length and its thickness extending horizontally transversely to its length.

Each shaping rail 10 and 11 is reinforced by outrigger bracing members 14 which are connected to the laterally outward facing surfaces of each of the longitudinally extending shaping rails 10 and 11 by horizontally extending, spaced connecting members 16. The outrigger bracing members 14 also rigidly support four laterally outward extending arms 18 which serve as stop members. The outrigger bracing members 14 support additional laterally outward, horizontally extending arms 20 on the laterally outer ends of which are supported one of four bearing housings 21. The outrigger bracing members 14 are connected to horizontally and transversely outward extending connecting members 22 to longitudinally extending members 24 of a cradle-like mold supporting carriage. The carriage includes, in addition to the longitudinally extending members 24, obliquely upward extending connecting members 25 and horizontal extension members 26 which are interconnected through end connecting brackets 28 at each longitudinal end of each of the horizontal extension members 26. The end connecting brackets 28 include a pair of transversely extending runners 29 adapted to ride over stub rolls 30 in a heating furnace provided with the usual complement of heating elements which may be of the electric or gas burning type.

An elongated lever arm 32 that is counterweighted on its longitudinally inner end is mounted for pivoting about each of the bearing housings 21. Each lever arm 32 extends longitudinally outward to a connection with an end section outrigger 34. The outriggers 34 are arranged in pairs and provide a rigid pair of connections between a pair of lever arms disposed at each longitudinal end of the mold and an outrigger bracing member 36. Each of the latter is arranged in outward encompassing relation about an associated end shaping rail 38 or 39 and is attached to the latter through spaced connectors 40. Each end section rail 38 and 39 forms an end section of the mold and is oriented in a similar fashion to shaping rails 10 and 11 with its length curved to form a longitudinal end of the outline shaping surface. In this manner, the lever arms and outriggers cooperate with the bearing housings to provide means for pivotally supporting each end shaping rail relative to the main mold section.

The upper edge surface of the shaping rails 10, 11, 38 and 39 are serrated to allow air blasts to move between the bent glass sheet and the supporting mold when the glass-laden mold is in a cooling station that it occupies after bending. The connectors 40 and connecting members 16 extend in directions parallel to the tangent to the portion of the shaping surface defined by the upper edge surface of the attached shaping rail.

The lever arms 32 are so weighted relative to the bearing housings 21 and the mass of the end section outriggers 34 and outrigger bracing members 32 and end shaping rails 38 and 39 to tend to pivot the end shaping rails 38 and 39 about an associated pair of transversely spaced bearing housings 21 into a closed mold position depicted in FIG. 2 in the absence of any outside force. Shaping rails 10 and 11 are provided with longitudinal ends 41 whereas the end shaping rails 38 and 39 are curved to form the ends of the outline shaping surface and extend longitudinally inward to form inner ends 42 at the longitudinal inner extremities thereof. The inner ends 42 are spaced from the longitudinal ends 41 in the spread mold position of FIG. 1 and are closely adjacent thereto in the closed mold position of FIG. 2.

What has been described thus far represents a typical prior art glass sheet bending and tempering mold wherein the cradle-like supporting carriage occupies approximately the same plane and is spaced outwardly from the side edges of the sectionalized mold it supports when the end shaping rails 38 and 39 are pivoted into the closed mold position depicted in FIG. 2 to permit a shaped glass sheet and its supporting mold and mold carriage structure to pass through a curved space between shaped upper and lower arrays of nozzle openings extending toward one another from plenum chambers through which air is blasted against the opposite surfaces of bent glass sheets in a manner well known in the art of bending and tempering glass sheets.

The dimension occupied by each cross-sectional thickness of the mold and its supporting structure in prior art tempering molds is a maximum of about 3 inches (76 millimeters) normal to the localized tangent to the shaping surface to permit this clearance. In the present invention, the additional elements provided for the mold structure to produce the one or more sharp bends desired are contained within the dimensions required by prior art tempering molds and their support structures.

Each end 41 of the shaping rails 10 and 11 and each end 42 of the end shaping rails 38 and 39 is cut obliquely downward from its serrated upper edge surface at a relatively sharp angle of divergence from its associated end 41 or 42 and a thin sheet 44 of electrical insulator material is attached against a surface of the end of the respective shaping rails. The sheets 44 of insulator material are shaped to form outer edges that extend obliquely downward at lesser angles of divergence than the shaping rails to which they are attached to provide means to insulate the ends of the shaping rails electrically from electroconductive heating elements that extend across the mold below its shaping surface and between the downwardly diverging edges of each adjacent pair of ends 41 and 42 according to the present invention for a purpose to be described.

According to a specific embodiment of FIGS. 1 and 9 inclusive for providing double V-bends, each mold is provided with a pair of electroconductive heating elements in the form of flat, flexible ribbons that are permanently disposed below the mold shaping surface and extend across the mold in lines that traverse the downwardly obliquely diverging ends of adjacent shaping rails. The ribbons form part of an electrical circuit adapted for electrical engagement with a source of potential to provide current to said electroconductive heating ribbons when said circuit is coupled to said source of potential and are located in positions where they do not interfere with loading or unloading of the mold but in positions where the electroconductive heating ribbons can radiate additional localized heat toward closely spaced glass sheet portions that extend along the lines desired for sharp bending when the circuit is energized. The lines along which the ribbons extend are closely adjacent to the lines of support for the flat glass formed by the transversely opposed ends 41 of shaping rails 10 and 11.

Flat ribbons are preferred over rods or wires as the electroconductive heating means carried by the mold below the mold shaping surface in closely spaced relation to the glass, particularly when the flat upper surface of the ribbon is disposed parallel to the exposed lower surface of the supported glass sheet. Flat ribbon radiate a larger proportion of the heat developed by electrical energy in a direction normal to their flat surface, whereas wires radiate heat radially in all directions, thus providing a smaller amount of the electrically generated heat along the line of sharp bending unless used in conjunction with heat reflectors which complicate the heat generating system of the furnace. Secondly, a ribbon of given electroconductivity is lighter than a rigid, round rod and cools more rapidly when the bent glass is quenched in cold air blasts after shaping than round rods. Hence, thin ribbon provide less of a heat sink that would tend to disrupt the uniformity of cooling pattern desired in the glass than a round rod providing the same electroconductivity. Furthermore, a round wire having equivalent current carrying capacity to that of a flat ribbon is more rigid and tends to kink and remains permanently kinked if engaged locally by a guiding means to lower the heating element away from close proximity to the glass as is sometimes required. This kinking cannot be removed readily from round wire for a subsequent bending cycle under circumstances in which tension applied to a ribbon removes such a kink.

In a specific embodiment of this invention, the electroconductive circuit adapted for coupling to a source of voltage comprises a pivoted electrode 50 pivotally mounted on a hinge 51 supported on an insulating support member 52 of an electrically insulating material carried by each of the transversely extending runners 29. The pivoted electrode 50 is attached on the side opposite the hinge 51 to a counterweighted lever arm 53. (See FIG. 7).

A flexible lead wire 54 is connected at one end to the bottom surface of each pivoted electrode 50 and a power lead wire 55 is connected to the other end of each flexible lead wire 54. Wires 54 and 55 are enclosed in electrical insulator material to insulate them electrically from the metal of the mold and its support structure. Each power lead wire extends in insulated relation along one or the other of the transversely extending runners 29 of the end connecting brackets 28, the horizontal extension members 26, the obliquely extending connecting members 25 and the longitudinally extending members 24 of the mold supporting carriage and is supported relative to these members by spaced insulator supports 56. Each of the power lead wires 55 is connected to an electrode 60 that terminates in a hook 62 through an angularly shaped threaded rod 63 and a flexible connection wire 61 (FIG. 8). The electrode is fixed to a metal bearing housing rotor 66 rotatably supported about the angularly shaped threaded rod 63 so that each electrode 60 pivots with rotor 66 relative to the rod 63 and is connected to an elbow type structure provided with an outer weighted lever arm 64 having a weight 65 on its distal end, which weight biases the pivoting of the elbow type structure to cause hook 62 to rotate upwardly and laterally outwardly about an axis generally parallel to the length of shaping rails 10 and 11. Wire 61 bypasses the rotatable connection between rotor 66 and rod 63 to avoid arching.

The shaping rail reinforcement structure also supports two apertured platforms 67. An externally threaded angular shaft 68 has a vertical leg adjustable fixed relative to each apertured platform 67 by lock nuts. The horizontal legs of angular shafts 68 adjustably support spools 70 and 72 of four circumferentially grooved spools 70, 71, 72 and 73. The spools form pairs of transversely spaced, circumferentially grooved spools 70 and 71 near one longitudinal end of the shaping rails 10 and 11 and an additional pair of circumferentially grooved spools 72 and 73 near the other end of the shaping rails 10 and 11. The spools are disposed laterally outward of the ends of the shaping rails 10 and 11. The lowermost portions of the grooved circumferences of the spools 70 and 71 are adjusted to be located in adjustably fixed position slightly below a line intersecting the upper edges of the ends of shaping rails 10 and 11. The spools are composed of a non-electroconductive material such as a machinable or moldable ceramic, for example, a glass ceramic composition sold under the trademark MACOR. Details of the means to adjust the position of a spool (which serves as means to guide the vertical position of the ribbon it engages) are shown in FIG. 9.

The electrical heating circuit also comprises additional electrodes 75 and 76, each rigidly supported in vertically and horizontally adjustably position transversely outward of spools 71 and 73 laterally outward of the ends of shaping rail 10. Electrodes 75 and 76 are interconnected by a power lead wire 77 carried in electrically insulated relationship to the metal of the mold and its supporting carriage by insulator supports 78 similar to insulator supports 56. Spools 71 and 73 are pivotally connected to the inner ends of curved arms 80 that extend transversely outward from the spools 71 and 73 along lengths that are curved both horizontally and vertically. The arms 80 are pivotally mounted around pivots 81 that are carried on short, longitudinally extending legs of angular, externally threaded rods 82. The latter, in turn, are adjustably mounted on apertured mounting plates 83 secured to a convenient portion of the support carriage structure. The pivots 81 form pivot axes extending approximately longitudinally of the mold. The outer end of each curved arm 80 is slidably supported in bearing relation on the upper surface of one or the other of the elongated lever arms 32 longitudinally outward of its associated bearing housing 21. Each curved arm 80 is constructed and arranged with its center of gravity laterally outside the pivot 81 so that its outer end pivots downward to rest on its associated lever arm 32.

A thin, elongated electroconductive ribbon 84 has an end loop 85 connected to the hook 62 of one of the electrodes 60 and its other end clamped to additional electrode 75 while another electroconductive ribbon 86 has its end loop 85 connected to the hook 62 of the other electrode 60 and its other end clamped to the additional electrode 76. Each of the ribbons 84 and 86 extends from its electrical connection to the hook 62 of each electrode 60 beneath the grooved portions of spools 70 and 72 in the case of ribbon 84 and beneath the grooved portions of spools 71 and 73 in the case of ribbon 86 and below and between the downwardly diverging ends 41 and 42 of adjacent shaping rails to the respective connections of ribbon 84 with additional electrode 75 and of ribbon 86 to additional electrode 76.

The ribbons in the illustrative embodiment are preferably double thicknesses of ribbon spot welded together approximately every 2 inches (5 centimeters) of length. The ribbons are composed of nichrome and are 3 mils (.08 millimeter) thick and one-eighth inch (3 millimeters) wide.

It is thus seen that spools 70 and 72 are fixed in their adjusted positions while spools 71 and 73 are capable of lowering when lever arms 32 rotate in conjunction with the pivoting of the end shaping rails 38 and 39 to the closed mold position. Thus, ribbons 84 and 86 are lowered when the end shaping rails close with the spools 70 to 73 serving as ribbon guiding means that establish the vertical position, orientation and direction of the ribbons that extend between laterally opposite ends of the shaping rails of the main mold section.

The distance the ribbon is separated below the support provided for the glass sheet depends upon the severity of bend desired along the line of sharp bending. For less severe bends, all four spools 70 to 73 may be adjustably positioned in fixed positions so that the ribbons extend at a fixed minimum distance of about one-fourth inch (6 millimeters) below the lines connecting the laterally opposing ends of the shaping rails 10 and 11. The need to lower the ribbons as the glass sags is not important in such an instance because the fixed spools can be positioned in such vertical dispositions relative to the ends of the shaping rails 10 and 11 that support the glass sheet that when the glass sheet mounted on the mold is heated, it sags transversely of the mold between its supports on the ends 41 of shaping rails 10 and 11 a distance too small to contact the ribbons. For sharper bends, the ribbons are initially supported about one-eighth inch (3 millimeters) and less from the glass. In such cases, it is necessary to lower the ribbons as the glass sags to conform to the mold shaping surface. Pivoting of the end shaping rail or rails occurs when the glass sags and initiates the lowering of the ribbon when the latter is necessary to avoid ribbon to glass contact.

The apparatus of FIG. 10 is similar to that of FIG. 9 except for the fact that a mold support carriage 91 supports a pair of molds 93 and 94 in mirror image relation to one another. Mold 93 is shown in the closed position after shaping a glass sheet supported thereon, while mold 94 is shown in the open position for receiving a flat glass sheet thereon for illustrative purposes only. It is understood that initially both molds are pivoted to the position depicted by mold 94 for loading a pair of glass sheets thereof for shaping the sheets in unison and that after bending is completed, both molds 93 and 94 are in the position depicted in FIG. 10 by mold 93.

Mold 93 comprises a main mold section 95 and a pivotable end mold section 96. In FIG. 11, a pair of roof panels 97L and 97R is shown. These have been bent on molds 93 and 94 with panel 97L having been bent on mold 93 with its main portion 98 supported on main mold section 95 and its end portion 99 supported on end mold section 96 to form the sharp line of bending along the portion of panel 97L that was superimposed over ribbon 84.

The circuit elements and the structural elements of the carriage 91 of FIG. 10 correspond to those of the FIGS. 1 to 9 embodiment. The same reference numbers are applied to FIG. 10 for several of these elements of FIGS. 1 to 9 to illustrate this correspondence of electrical and structural elements.

According to the method of the present invention, a flat glass sheet is mounted on a mold with its end shaping rails 38 and 39 rotated into a spread position depicted in FIG. 1. The flat glass mounted on the mold is initially supported on the outer longitudinal extremities of the end shaping rails 38 and 39 curved in plan and the ends 41 of the longitudinally extending shaping rails 10 and 11 with the ribbons 84 and 86 disposed slightly below the diverging spaces between the insulator sheets 44 covering the ends 41 of the longitudinally extending shaping rails 10 and 11 and the inner ends 42 of the end shaping rails 38 and 39. The ends of the shaping rails are angled downward and inward at a given angle and the insulator sheets 44 of non-conductive material bonded to the ends 41 and 42 of the rails at a lesser angle to extend into the space between the ends to provide means to prevent contact of the ribbons 84 and 86 with the shaping rails, thereby electrically insulating the ribbons from the shaping rails.

The glass-laden mold enters a bending furnace which has a pair of bus bars 90 mounted along the opposite side walls of said furnace for sliding engagement of their undersurfaces by the top surfaces of the pivoted electrodes 50. Leads 92 connect the bus bars 90 to a power supply. It is noted that the bus bars 90 are located in spaced relation above the stub rolls 30 of the furnace to provide clearance for moving the transversely extending runners 29 over the stud rolls 30 as the glass is heated within the heating furnace.

When the glass is heated sufficiently for softening, the end shaping rails 38 and 39 pivot upward to lift the longitudinal end portions of the supported glass sheet upward about lines parallel to and above the ribbons 84 and 86. These lines are approximately aligned with lines extending between transversely opposite ends 41 of the shaping rails 10 and 11.

FIG. 3 shows how one of the ribbons is initially supported in tension by its end loop 85 engaging the counterweighted electrode hook 62 so that the ribbon extends across the mold a short distance below the bottom surface of the flat glass sheet at the beginning of a bending cycle. As electric current is passed through the ribbons 84 and 86, the ribbons become heated and tend to elongate because of thermal expansion and would droop away from close proximity to the glass were it not for the fact that the weighted lever arms 64 hold the respective ribbons 84 and 86 in tension along the lines of support provided by the bottoms of the circumferential grooves in spools 70, 71, 72 and 73.

FIG. 4 shows how the lever arms 64 rotate to hold the ribbons in tension in closely spaced relation below the supported glass during an intermediate portion of the bending cycle when the ribbon have expanded somewhat, but have not radiated sufficient heat to develop lines of sharp bending in the glass. By the time the glass is heated sufficiently to enable the end shaping rails 38 and 39 to pivot upward to help form the sharp bends along the lines facing the ribbons, the glass also tends to sag transversely as shown in FIG. 5. The parts of lever arm 32 at the one side of the mold below the curved arms 80 lift as the end shaping rails pivot upward, thereby forcing the laterally outer ends of the curved arms 80 laterally outside the pivots 81 to also lift, thereby pivoting the spools 71 and 73 downward to lower one end portion of each of the ribbons 84 and 86 to a position sufficient to maintain clearance with the center of the glass sheets G intermediate the shaping rails 10 and 11 that sags the most as a result of the bending operation.

Thus, it is seen that when it is necessary to hold the ribbons 84 and 86 close to the glass initially (as little as one-eighth inch or 3 millimeters) so as to impress very sharp bends (less than one-half inch or 12 millimeters radius) on the glass, it becomes necessary to lower the ribbons as the glass sags. However, when the ribbons are initially supported a distance greater than the amount the glass sheet sags between transversely spaced supports at ends 41 (usually at least one-fourth inch or 6 millimeters or more), each of the guiding means or spools of each transversely spaced pair of spools may be rigidly supported on both sides of the mold at a suitable vertical position with the ribbons extending between the bottoms of transversely aligned grooved portions of the transversely spaced spool pairs in positions below the glass sheet across its entire width. Having the spools disposed with their grooves guiding the ribbons adjacent and below the lines of support defined by the transversely spaced ends 41 of the elongated, longitudinally extending shaping rails 10 and 11 of the main mold section develops a sharp line of bending in the glass portion facing each ribbon that has a reduced amount of sag compared to cross sag normally obtained along other lines extending across the mold. In other words, the combination of the specific position for the flat glass supports at the ends of the main mold section shaping rails and the ribbons extending adjacent lines defined by the ends of the main section shaping rails causes an improved definition of the line of sharp bending.

EXAMPLE

A typical cycle to produce a double V-bend and temper in glass sheets using bending and tempering apparatus comprising a two-stage furnace each provided with a separate pair of bus bars and an adjustable voltage source and a cooling station is as follows.

Furnace ambient temperature in the first stage averages about 1200° F. (649° C.) and in the second stage averages approximately 1430° F. (777° C.). A glass sheet is mounted on a mold after the latter returns from a heating and cooling cycle and the glass-laden mold enters the furnace with no power on the bus bars. Ten seconds after mold entry, power is applied to supply 5 amperes of electrical current to each ribbon. This current is increased in steps of 5 amperes every 10 seconds until current reaches 5 amperes after 1 minute in the furnace and is kept at this level. The mold moves to the second stage of the furnace after 3 minutes and 35 seconds when the glass sheet starts to bend. The bus bars in the second stage are spaced from the bus bars in the first stage by a short distance traversed by the pivoted electrodes in less than 1 second so that there is virtually no interruption in current so that current is applied almost continuously to the ribbons through the pivoted electrodes from the onset of the application of current to the ribbons.

At a time of 4 minutes and 35 seconds from its entry into the first stage of the furnace, current to the second stage bus bars is turned off and the bend is completed by exposure to ambient heat. At 4 minutes and 55 seconds, the mold enters a quenching station disposed beyond the exit of the furnace. Cool air jets applied through elongated, curved, slot-type nozzles impinge against the opposite major surfaces of the bent glass sheet to temper the latter in a manner well known in the art.

A typical quenching station has a pair of opposite nozzle sets disposed to provide a 6 inch (15 centimeter) space between sets. Each set comprises elongated nozzles one-fourth inch (6 millimeters) wide spaced about 4 inches (10 centimeters) apart center-to-center spacing reciprocating at a 5 inch (12.7 centimeter) displacement 30 cycles per minute. Air is supplied through these nozzles at a pressure of 9 to 12 ounces per square inch (0.04 to 0.05 atmospheres) depending on the glass thickness, which may be 5 millimeters to 6 millimeters, to impart a temper that develops a break pattern when the tempered glass is fractured that meets U.S. Government specifications (4.25 grams maximum particle size). Fifteen to twenty seconds of cooling under these conditions provide sufficient cooling to obtain adequate temper. For insurance, cooling continues for thirty seconds.

Separation between bus bars in the multiple stage furnace enables different glass sheets to occupy positions in the various stages. The duration of stay in the various stages of a multi-stage bending furnace is a maximum in the first stage and no more than the maximum for each successive stage in case of furnaces having two or more stages. In this way, each stage can be cleared for a new mold when a prior mold finishes its heating step and leaves said stage.

The present invention is also susceptible of use with furnaces having a continuous movement of glass sheets through the heating furnace where the pivoted electrodes contact spaced electrodes in succession as the molds move through the furnace in a continuous mass production operation.

In cases where glass sheets are to be bent to a single sharp curvature about one axis, two molds may be conveyed side-by-side, size permitting, with a pivoted end shaping rail of each mold disposed toward each side wall of the furnace. The ribbons for each mold may be operated simultaneously as they can be connected in series or in parallel between the bus bars carried by the laterally opposite walls of the furnace. If the sheets are too long to be conveyed in side-by-side relation, only one ribbon is in the circuit between the bus bars.

If glass sheets are to be bent sharply along a single axis extending in the direction of their length, the main mold section of the outline mold that supports the glass sheet for such shaping is provided with a pair of shaping rails that are relatively short in length and that are interconnected at one end by a relatively long connecting end rail, and the pivoted end mold section of the outline mold is also modified to conform with the outline of the end portion of the glass sheet to be shaped. The heating ribbon and its guiding means are otherwise constructed in a manner consistent with the other embodiments already described.

The form of the invention shown and described in this specification represents an illustrative preferred embodiment and certain modifications thereof. It is understood that various changes may be made without departing from the gist of the invention as defined by the claimed subject matter that follows.

I claim:

1. Apparatus for shaping a glass sheet to a shape that includes a sharp bend extending across a dimension of said sheet by the gravity sag method comprising a plurality of rigid, metal shaping rails disposed in end-to-end relation to define an outline shaping mold having an upper shaping surface conforming to the shape desired slightly inward of the margin of a glass to be shaped thereon, each of said shaping rails having an upper edge surface providing a different portion of said upper shaping surface and including an end shaping rail having inner ends defining an end section of said mold and a pair of longitudinally extending, transversely spaced shaping rails defining a main section of said mold, means supporting said end shaping rail for pivoting relative to said main mold section between an open mold position wherein the inner ends of said end shaping rail are separated from a pair of transversely spaced ends of said elongated shaping rails and a closed mold position where said inner ends of said end shaping rail are closely spaced from said pair of ends of said elongated shaping rails, the ends of said elongated shaping rails providing supports for a flat glass sheet intermediate its ends when said sheet is mounted on said mold for bending and providing supports for the glass sheet after the latter is bent adjacent the inner ends of said end shaping rail, an elongated, electroconductive ribbon extending across the space between said elongated shaping rails entirely below said upper shaping surface along a line in close adjacency to the pair of flat glass supporting ends of said elongated shaping rails, guiding means located laterally outside each of said elongated shaping rails and having a surface engaging said ribbon to control the vertical position of said flexible electroconductive ribbon to one below said shaping surface, a pair of electrodes comprising an electrode laterally outside each of said guiding means for electrical connection with the ends of said ribbon and means carried in electrically insulating relation to said mold and its support adapted to couple said pair of electrodes to a source of electrical energy, said apparatus being clear of any structural element above the area enclosed by said rigid metal shaping rails to facilitate loading and unloading of a glass sheet relative to said mold.

2. Apparatus as in claim 1, comprising means operatively connected to said end shaping rail and responsive to pivoting movement thereof toward said closed mold position to lower said guiding means a further distance below said upper shaping surface, thereby lowering said ribbon in response to said pivoting movement.

3. Apparatus as in claim 2, wherein said means operatively connected to said end shaping rail comprises a longitudinally extending lever arm connected to said end shaping rail for pivotal movement therewith in a path laterally outside said mold about an axis extending transversely of the mold, a transversely extending lever arm pivoted for movement about an axis extending longitudinally of the mold for pivoting the laterally outer portion of said transversely extending lever arm across and above the path of pivotal movement for said longitudinally extending lever arm, said guiding means being connected to the inner end of said transversely extending lever arm for movement against the upper surface of said ribbon inward of its connection to said electrode disposed to the same side of said mold as said lever arm between said mold and said longitudinally extending axis, whereby said transversely extending lever arm pivots to lower said guiding means in response to said end shaping rail pivoting to a closed mold position.

4. Apparatus as in claim 3, wherein the ends of said shaping rails adjacent to one another in the closed mold position diverge from one another at a relatively large angle in a downward direction from said shaping surface to provide clearance for said ribbon between said adjacent shaping rails and insulating material is bonded to the end portions of said shaping rails to insulate said rails electrically from said ribbon.

5. Apparatus as in claim 1 for use in shaping a glass sheet to a double V-bend, further including a second end shaping rail defining a second end section of said mold supported for pivoting relative to said main mold section between said open mold position wherein the inner ends of said second end shaping rail are separated from the other pair of transversely spaced ends of said elongated shaping rails and a closed mold position wherein said inner ends of said second end shaping rail are closely spaced from said other pair of ends of said elongated shaping rails, the other ends of said elongated shaping rails providing additional supports for said flat glass sheet intermediate its ends when said sheet is mounted on said mold for bending and supporting the glass sheet after the latter is bent adjacent the inner ends of said second end shaping rail, a second elongated, electroconductive ribbon extending across the space between said elongated shaping rails entirely below said upper shaping surface along a line in close adjacency to said another pair of ends, additional guiding means located laterally outside each of said elongated shaping rails and having a surface engaging said second ribbon to control the vertical position of said second ribbon to one below said shaping surface, a second pair of electrodes comprising an electrode laterally outside each of said guiding means for electrical connection with the ends of said second ribbon, and means in electrically insulating relation to said mold and its support adapted to couple said second pair of electrodes to said electrical energy.

6. Apparatus as in claim 5, comprising means operatively connected to each of said end shaping rails and responsive to pivoting movement thereof toward said closed mold position to lower said guiding means, thereby lowering said ribbons a further distance below said upper shaping surface in response to said pivoting movement.

7. Apparatus as in claim 6, wherein each of said means operatively connected to said end shaping rail comprises a longitudinally extending lever arm connected to said end shaping rail for pivotal movement therewith in a path laterally outside said mold about an axis extending transversely of the mold, a transversely extending lever arm pivoted for movement about an axis extending longitudinally of the mold for pivoting the laterally outer portion of said transversely extending lever arm across and above the path of pivotal movement for said longitudinally extending lever arm, said guiding means being connected to the inner end of said transversely extending lever arm for movement against the upper surface of said ribbon inward of its connection to said electrode disposed to the same side of said mold as said lever arm between said mold and said longitudinally extending axis, whereby said transversely extending lever arm pivots to lower said guiding means in response to said end shaping rail pivoting to a closed mold position.

8. Apparatus as in claim 7, wherein the ends of said shaping rails adjacent to one another in the closed mold position diverge from one another at a relatively larger angle in a downward direction from said shaping surface to provide clearance for said ribbon between said adjacent shaping rails and insulating material is bonded to the end portions of said shaping rails to insulate said shaping rails electrically from said ribbon.

9. Apparatus for shaping a glass sheet to a shape that includes a sharp bend extending across a dimension of said sheet by the gravity sag method comprising a plurality of rigid metal shaping rails disposed in end-to-end relation to define an outline shaping mold having an upper shaping surface conforming to the shape desired slightly inward of the margin of a glass sheet to be shaped thereon, each of said shaping rails having an upper edge surface providing a different portion of said upper shaping surface and including an end shaping rail defining an end section of said mold and a pair of longitudinally extending, transversely spaced shaping rails defining a main section of said mold, means supporting said end shaping rail for pivoting relative to said main mold section between an open mold position wherein said end section is spaced from said main section and a closed mold position where said end section is closer to said main section, an elongated, electroconductive ribbon extending along the space between said end section and said main section entirely below said upper shaping surface, guiding means located laterally outside each of said elongated shaping rails and having a surface engaging said ribbon to control the vertical position of said flexible electroconductive ribbon to one below said shaping surface, a pair of electrodes comprising an electrode laterally outside each of said guiding means for electrical connection with the ends of said ribbon and means carried in electrically insulated relation to said mold and its support adapted to couple said pair of electrodes with a source of electrical energy, said apparatus being free of any structural element above the area enclosed by said rigid metal shaping rails to facilitate loading and unloading of a glass sheet relative to said mold.

10. Apparatus as in claim 9, comprising means operatively connected to said end section and responsive to pivoting movement thereof to raise and lower said surface of said guiding means to different positions below said upper shaping surface.

11. Apparatus as in claim 9, for use in shaping a glass sheet to a double V-bend, further including a second end shaping rail defining a second end section of said mold supported for pivoting relative to said main mold section, further including a second elongated, electroconductive ribbon extending along the space between said main mold section and said second end section entirely below said upper shaping surface, additional guiding means located laterally outside each of said elongated shaping rails and having a surface engaging said second ribbon to control the vertical position of said second ribbon to one below said shaping surface, a second pair of electrodes comprising an electrode laterally outside each of said guiding means for electrical connection with the ends of said second ribbon, and means in electrically insulating relation to said mold and its support adapted to couple said second pair of electrodes to said source of electrical energy.

12. Apparatus as in claim 11, comprising means operatively connected to said end section and responsive to pivoting movement thereof to raise and lower said surface on said guiding means to different positions below said upper shaping surface.

13. Apparatus as in claim 9 for shaping a pair of glass sheets simultaneously to the mirror images of one another comprising a common mold support carriage and a pair of said outline shaping molds as defined in claim 9 supported in mirror image relation to the longitudinal center line of said mold support carriage.

14. A method of bending a glass sheet to a sharp bend by the gravity sag technique on an outline sectionalized mold comprising supporting a flat glass sheet intermediate its end on a pair of transversely spaced ends of elongated shaping rails forming a main section of said mold and at one longitudinal end portion thereof on the longitudinally outer portion of an end shaping rail pivotally movable between a spread mold position where its inner ends are spaced from the ends of said main section shaping rails and a closed mold position wherein said ends of said shaping rails are adjacent to one another so that a main portion of said glass sheet is superimposed over said main section of the mold and an end portion of said glass sheet is superimposed over said end shaping rail of the mold, supporting an electroconductive ribbon below and in approximate alignment with a line of support provided by said pair of ends of said main section shaping rails, heating the glass sheet in an enclosed hot atmosphere to an elevated temperature, applying electric current to said electroconductive ribbon whereby the latter radiates heat upward toward the bottom surface of said supported glass sheet, pivoting said end shaping rail upward to fold the end portion of said glass sheet supported thereon relative to the main portion of said glass sheet along a line aligned with the length of said ribbon.

15. The method as in claim 14, comprising supporting said ribbon in closely spaced relation below said transversely spaced supports at the beginning of said heating step and at a greater distance below said supports when said end portion of said glass sheet folds upward.

16. The method as in claim 14, wherein said glass sheet has a second end portion supported on the longitudinally outer portion of an end shaping rail pivotally movable between a spread mold position where its inner ends are spaced from the ends of said main section shaping rails longitudinally opposite said first pair of ends and a closed mold position wherein said ends of said end shaping rail are adjacent said longitudinally opposite ends, further including supporting said flat glass sheet intermediate its ends on said longitudinally opposite ends, supporting another electroconductive ribbon below and in approximate alignment with a line of support provided by said longitudinally opposite ends, applying electric current to both said ribbons simultaneously whereby both said ribbons radiate heat upward toward the bottom surface of said supported glass sheet along lines adjacent said lines of support and pivoting both said end shaping rails upward to fold the end portions of said glass sheet supported thereon relative to the main portion of said glass sheet along lines aligned with the length of said ribbons.

17. The method as in claim 16, comprising supporting both said ribbons in closely spaced relation below said supports at the beginning of said heating step and at a greater distance below said supports when said end portion of said glass sheet folds upward.

18. A method as in claim 14, followed by cooling said glass sheet after it conforms to the shape of said shaping rails.

19. A method as in claim 18, wherein said cooling is accomplished sufficiently rapidly to impart at least a partial temper to said sharply bent glass sheet.

20. A method as in claim 14, for use in bending an elongated glass sheet about an axis of bending in the direction of its length, wherein said electroconductive ribbon is supported below said mold between said main mold section and the inner ends of said end shaping rail in the direction of the length of said glass sheet.

21. A method as in claim 14, for use in simultaneously bending a pair of glass sheets comprising supporting said pair of glass sheets in mirror image relation to one another relative to a longitudinal center line of said support during said method.

* * * * *

UNITED STATES PATENT AND TRADEMARK OFFICE
CERTIFICATE OF CORRECTION

PATENT NO. : 4,072,493

DATED : February 7, 1978

INVENTOR(S) : Vaughn R. Imler

It is certified that error appears in the above-identified patent and that said Letters Patent are hereby corrected as shown below:

Column 2, line 30, "ribbon" should be --ribbons--.

Column 6, line 38, "cyle" should be --cycle--.

Column 10, line 8, "arching" should be --arcing--.

Column 10, line 11, "adjustable" should be --adjustably--.

Column 11, line 55, "thereof" should be --thereon--.

Column 12, line 57, "ribbon" should be --ribbons--.

Column 12, line 64, "arm" should be --arms--.

Column 13, line 52, "5" should be --25--.

Column 14, line 32, after "contact" please insert --closely--.

Column 15, line 2, after "glass" please insert --sheet--.

UNITED STATES PATENT OFFICE
CERTIFICATE OF CORRECTION

Patent No. 4,072,493  Dated February 7, 1978

Inventor(s) Vaughn R. Imler

It is certified that error appears in the above-identified patent and that said Letters Patent are hereby corrected as shown below:

Column 16, line 34, after "said", second occurrence, insert -- source of --.

Column 16, line 65, "larger" should read -- large --.

Column 17, line 40, "of" should read -- on --.

Column 18, line 6, "end" should read -- ends --.

Signed and Sealed this

Eleventh Day of July 1978

[SEAL]

Attest:

RUTH C. MASON
Attesting Officer

DONALD W. BANNER
Commissioner of Patents and Trademarks